June 15, 1965

B. E. MILLER ETAL 3,189,874

CODE RESPONSIVE RECEIVER HAVING MEANS FOR IGNORING REPEATED TRANSMISSIONS OF THE SAME DIGITAL CODE

Filed July 20, 1959

2 Sheets-Sheet 1

INVENTORS:
DARRELL D. DAHLSTROM
BYRON E. MILLER
BY: Theodore E. Bieber
THEIR ATTORNEY INVENTORS:
DARRELL D. DAHLSTROM
BYRON E. MILLER
BY: Theodore E. Bieber
THEIR ATTORNEY United States Patent Office 3,189,874
Patented June 15, 1965

3,189,874

CODE RESPONSIVE RECEIVER HAVING MEANS FOR IGNORING REPEATED TRANSMISSIONS OF THE SAME DIGITAL CODE

Byron E. Miller and Darrell D. Dahlstrom, Houston, Tex., assignors to Shell Oil Company, a corporation of Delaware Filed July 20, 1959, Ser. No. 828,282
2 Claims. (Cl. 340—147)

Figure 1A:
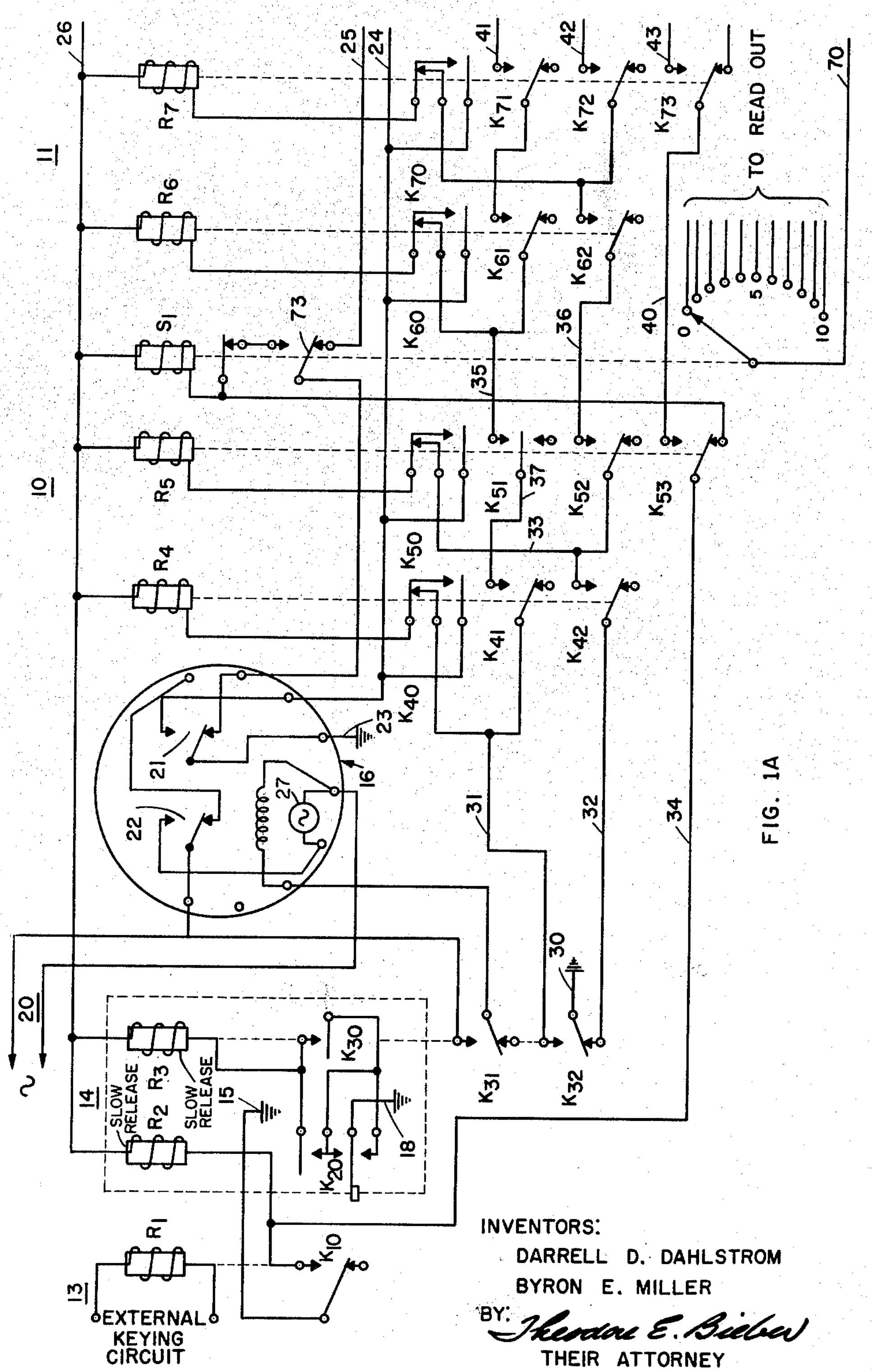

This invention pertains to an electro-mechanical translating device and more particularly to an electro-mechanical device for converting a sequential digital code into a useful output.

Much information which is used today for controlling various devices is prepared in the form of a digital code so that it may be readily transmitted from one location to another. The information contained in the digital code may take various forms, for example, the information required to control various machine tools or the simple code used in telephone paging systems for locating a person by means of an individual paging system. In order to control the machine tool or actuate the paging system it is of course necessary to convert the sequential digital code into an output capable of actuating the device. More particularly it is usually necessary to convert the code into a mechanical signal whose quantity is proportional to the digital code and can be used for controlling the machine tool or paging system.

This invention is particularly useful with a digital code having relatively uniform pulse duration and uniform time spacing between the pulses, digits and groups of the code. While the pulse duration and time spacing must be relatively uniform the invention is not limited to any particular pulse duration or the time spacing. The translator of this invention utilizes the time duration of the pulses and the time spacing between the pulses, digits and groups in conjunction with a timing circuit means to control the switching of code pulses from one electro-mechanical timing device to the succeeding device in order to convert the individual digits into a useful output.

Accordingly, the principal object of this invention is to provide an electro-mechanical type of translator which is capable of rapidly and efficiently converting a sequential digital code into a useful output.

A further object of this invention is to provide an electro-mechanical translator which utilizes timing and switching circuits to control the operation of electro-mechanical devices which convert a sequential digital code into a useful output.

A still further object of this invention is to provide a novel accumulating and switching circuit for use in electro-mechanical translators which is capable of converting the pulses corresponding to an individual digit into a useful output and then switch the digital code to the next accumulator.

The above objects and advantages of this invention are obtained by providing a timing and switching circuit which, in combination with the accumulating device switches the digital code from one accumulating device to the next upon the completion of the counting of the pulses corresponding to an individual digit. A separate accumulating device is provided for each digit of the code and consists of a pair of relays and an electro-mechanical device. The electro-mechanical device is utilized to count the pulses corresponding to the digits while the relays are coupled in a novel circuit to switch the digital code to the next accumulating device upon completion of counting of the pulses corresponding to the digit.

Figure 2:
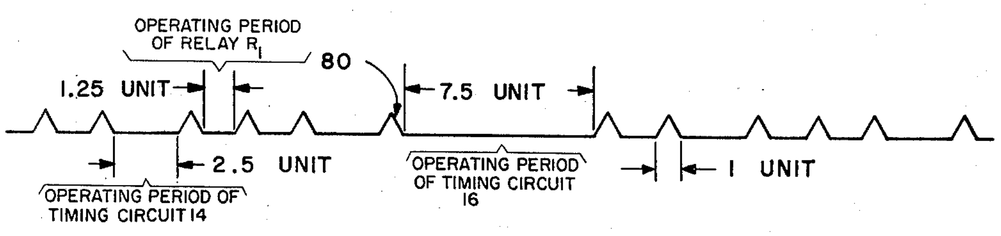
Figure 1B:
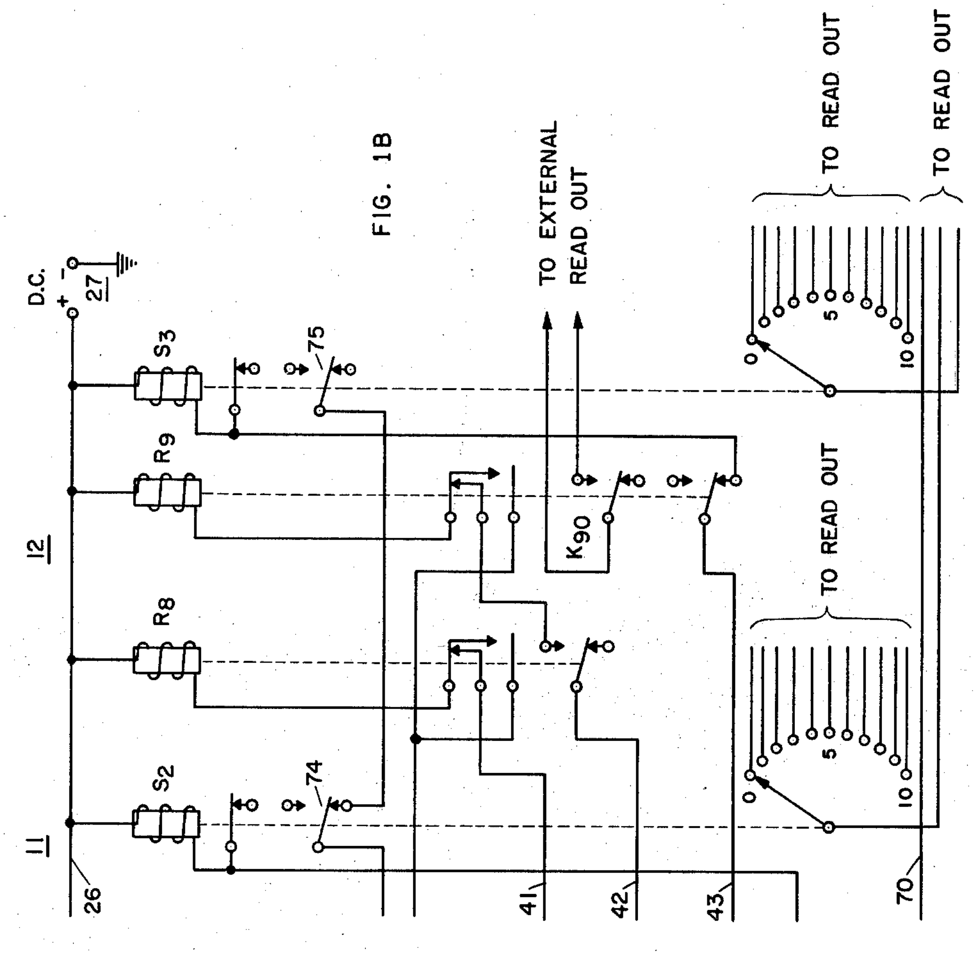

The above objects and advantages will be more easily understood from the following detailed description when taken in conjunction with the attached drawings in which:

FIGURES 1A and 1B are schematic drawings of a circuit showing the invention applied to a digital code consisting of three digits; and FIGURE 2 is a drawing showing the relative time duration of the individual pulses and time spacing between the digits and groups of digits.

Referring now to FIGURE 1, there are shown three accumulators 10, 11 and 12 which are controlled by a keying circuit 13, a first timing circuit 14, and a second timing circuit 16. The first timing circuit 14 in combination with each accumulator controls the switching of the digital code from one accumulator to the next while the timing circuit 16 controls the resetting of the system and the returning of each stepping switch to its initial condition at the end of a predetermined time after the end of a particular code. The particular position or quantity on each electro-means is interrogated individually by means of an external circuit so that its position may be ascertained and used to control the equipment for which the digital code was prepared.

The keying circuit 13 consists of a relay $R_1$ having a single set of contacts $K_{10}$ whose switch arm is connected to a ground 15. The relay $R_1$ closes on one of the contacts $K_{10}$ for each pulse received to connect the lead 34 of the stepping switch $S_1$ to the ground 15 as well as connect the relay $R_2$ of the first timing circuit 14 to the ground 15. The timing circuit 14 consists of two relays $R_2$ and $R_3$ having contacts $K_{20}$, $K_{30}$, $K_{31}$ and $K_{32}$, respectively. The switch arm of contacts $K_{20}$ is connected to a ground 18 while the switch arm of the contacts $K_{30}$ is connected to one of the contacts $K_{20}$. The switch arm of contacts $K_{31}$ is connected to the motor of the timing means 16 while one contact of $K_{31}$ is connected to the alternating power supply 20. The switch arm of contacts $K_{32}$ is connected to a ground 30 while one contact of $K_{32}$ is connected to a lead 31 and the other to a lead 32. Thus, the contacts $K_{20}$ connect the relay $R_3$ to ground while the contacts $K_{31}$ are used for coupling the circuit of the second timing means 16 to the alternating current supply 20. The contacts $K_{32}$ alternately connect one of the two leads 31 and 32 to the ground 30 in order to actuate the relays of the accumulators 10, 11 and 12 as explained below.

The second timing means 16 is shown as a motor-driven timing means having two sets of contacts 21 and 22. A suitable timing means 16 would be a Time Delay Relay Model 420 manufactured by the R. W. Cramer Company, of Centerbrook, Connecticut, and described in their catalogs. The movable arm of the contact 21 is connected to the ground 23, while one of the contacts of 21 is connected to the lead 24 and the other to lead 25. Thus, the contact 21 acts as a reset device to connect the lead 24 to ground when the device is received a digital code and to connect the lead 25 to ground when the second timing means has completed its cycle after the digital code has stopped to return the stepping switches to their initial condition of operation. The contacts 22 are used to set the time delay of the second timing means 16 and should be adjusted to open after a time duration longer than that occurring between the various groups of digits of the digital code. When the contacts 22 open the timing means 16 is returned to its initial condition by a spring or other means.

Since each of the accumulating means 10, 11 and 12 are substantially the same only one will be described in detail. The accumulating means 10 consists of two relays $R_4$ and $R_5$ and a stepping switch $S_1$. The relay $R_4$ is provided with three sets of contacts $K_{40}$, $K_{41}$ and $K_{42}$ while the relay $R_5$ is provided with four sets of contacts $K_{50}$, $K_{51}$, $K_{52}$ and $K_{53}$. The switch arms of contacts $K_{40}$ and $K_{41}$ of the relay $R_4$ are coupled to the lead 31 while the switch arm of contact $K_{42}$ are coupled to the lead 32. The contacts of $K_{40}$ should be of the make-before-break type in order that they may lock the relay $R_4$ in a closed position once the relay is actuated, one contact being connected to the grounded lead 24 and the other to the solenoid winding of $R_4$. One contact of $K_{42}$ is coupled to a lead 33 with the lead 33 in turn being coupled to the switch arm of contact $K_{50}$ of the relay $R_5$ to initiate operation of the relay $R_5$ at the conclusion of the pulses of the first digit. The switch arm of contact $K_{41}$ is connected to lead 31 and one contact of $K_{41}$ is connected to the switch arm of $K_{51}$ by a lead 37. The contacts $K_{50}$ of the relay $R_5$ should also be of the make-before-break type in order to lock the relay $R_5$ closed once it is actuated. One contact of $K_{42}$ is coupled to the switch arms of contacts $K_{52}$ and $K_{50}$ by a lead 33 with one contact of $K_{50}$ being connected to the ground bus 24 and the other to the solenoid of $R_5$ while one contact of $K_{52}$ is connected to the switch arm of contact $K_{62}$ of relay $R_6$ by a lead 36. The switch arm of contacts $K_{53}$ is connected to lead 34 while one contact of $K_{53}$ is connected to the switch arm of $K_{73}$ by a lead 40 and the other contact of $K_{53}$ is connected to the solenoid of stepping switch $S_1$.

The accumulator 11 consists of two relays $R_6$ and $R_7$ and a stepping switch $S_2$. The relays $R_6$ and $R_7$ have the same contacts as the relays $R_4$ and $R_5$ of the accumulator 10 and they are disposed in the same manner. The contacts of the relays $R_5$ and $R_7$ are coupled to the contacts of the relays $R_8$ and $R_9$ of the accumulator 12 by means of leads 41, 42 and 43 in the same manner in which the leads 35, 36 and 40 couple the contacts of the relays $R_4$ and $R_5$ to the relays $R_6$ and $R_7$.

Power from a direct current source 27 is supplied to a power bus 26 to which all the relays and stepping switches are connected. The direct current power source 27 may also be connected to an external read-out device (not shown) through a set of contacts $K_{90}$ on relay $R_9$ but in any case the contacts $K_{90}$ are used to operate the external read-out device to interrogate the stepping switches. The external read-out device should be capable of interrogating each stepping switch $S_1$, $S_2$ and $S_3$ simultaneously or in succession to determine their position. Various devices are available for performing this function which are capable of both interrogating the stepping switches and supplying their position to the equipment controlled by the digital code.

The operation of the above-described translator can be more easily understood with reference to a particular digital code shown in FIGURE 2. It is, of course, to be understood that the digital code shown in FIGURE 2 is merely illustrative of one of a particular three digit code and that any three digit code could be used with the circuit shown in FIGURE 1 or the circuit in FIGURE 1 could be expanded by adding additional accumulating means to handle a code having any number of digits. The code shown in FIGURE 2 represents the group of digits 231 and as shown the pulse duration of the code is one unit while the time spacing between pulses is 1.25 units, the time spacing between digits is 2.5 units and the time spacing between groups of digits is 7.5 units. The choice of these pulse durations and time spacings is of course arbitrary and can be varied in addition to which the time allotted to each unit can be varied. The only requirement being that sufficient time must be provided to allow the relays used in the device to operate. When the first pulse 80 is received it will actuate the keying circuit 13 to close the contacts $K_{10}$ of the relay $R_1$. This in turn will couple the stepping switch $S_1$ to the ground 15 through the contact $K_{53}$ and the lead 34, accordingly, the stepping switch will step off to the position corresponding to one unit. Closing the contacts $K_{10}$ will also couple the relay $R_2$ to ground thus closing the contact $K_{20}$ which in turn will couple the relay $R_3$ to ground so that the relay operates to close contacts $K_{30}$, $K_{31}$ and $K_{32}$. The closure of contact $K_{31}$ will couple the motor 28 of the second timing means 16 to the alternating current supply 20 and thus start the running of the cycle of the second timing means. The closure of the contacts $K_{32}$ will couple the relay $R_4$ of the accumulator 10 to the ground 30 through the contact $K_{40}$ thus actuating the relay $R_4$. Since the contacts $K_{40}$ are of the make-before-break type once the relay $R_4$ is actuated it will remain in a closed position until the contacts 21 of the second timing means 16 open thus disconnecting the lead 24 from the ground 23. Closure of the contacts $K_{42}$ arrange the contacts $K_{50}$ of the relay $R_5$ so that the relay $R_5$ will close upon opening of the contact $K_{32}$. The closure of the contacts $K_{41}$ of course merely establishes the first link in the connection between the ground 30 and the contacts of the relay $R_6$.

At the end of the first pulse the relay $R_1$ will be de-energized thus opening the contacts $K_{10}$. When the contact $K_{10}$ open the relays $R_2$ and $R_3$ will start their time delay cycle. The time delay of relays $R_2$ and $R_3$ should be adjusted so that it is longer than the time spacing between the individual pulses, a preferred time being two units. Thus, nothing will happen during the time spacing interval between the two pulses and the next pulse will again energize the relay $R_1$ and close the contact $K_{10}$. The closure of the contacts $K_{10}$ will reset the relays $R_2$ and $R_3$ so that they will start their time delay cycle again upon opening of the contacts $K_{10}$. Closing of of the contacts $K_{10}$ will, of course, again couple the stepping switch $S_1$ to ground through the lead 34 and the contact $K_{53}$. Thus, the stepping switch will step off another unit making the position of the stepping switch $S_1$ correspond to two units. At the end of the second pulse the relay $R_1$ will again be de-energized and the contact $K_{10}$ opened. Since the space between the second pulse and the next pulse is 2½ units or the time spacing between individual digits of the code, the relays $R_2$ and $R_3$ will now become de-energized and open. When the relay $R_3$ becomes de-energized and the contacts $K_{31}$ and $K_{32}$ open, the second timing circuit 16 will start its present time delay cycle. This time delay should be set relatively long so that the complete circuit will not be de-energized by the opening of the reset contacts 21. Since the timing circuit 16 is reset each time the contact $K_{31}$ closes and begins timing each time $K_{31}$ opens, a suitable time delay would be ten units which is greater than any delay occurring in the digital code shown in FIGURE 2. The opening of the contacts $K_{32}$ will couple the relay $R_5$ to the ground 30 through the lead 33 and the closed contacts $K_{42}$ and the lead 32. Thus, relay $R_5$ will operate to close the contacts $K_{50}$, $K_{51}$, $K_{52}$ and $K_{53}$. The relay $R_4$, of course, remains closed since it is locked closed until the ground bus 24 is disconnected from the ground 23 by the opening of the contacts 21. Closure of the contact $K_{51}$ arranges the contact $K_{60}$ of the relay $R_6$ to be coupled to the ground 30 through the leads 31 and 35 and the contacts $K_{41}$ and $K_{51}$ when relay $R_3$ is again energized. Thus, relay $R_6$ will be energized when the next pulse is received. Closing of the contacts $K_{53}$ decouples the stepping switch $S_1$ from the ground 15 and couples the stepping switch $S_2$ to the ground 15 so that the circuit will count the pulses of the second digit of the code shown in FIGURE 2 in the same manner as described above for the accumulating means 10. After completion of the counting of the third pulse of the second digit the relays $R_2$ and $R_3$ will again become de-energized and also the contacts $K_{31}$ and $K_{32}$ which in turn will energize the relay $R_7$ and prepare the circuit for switching the code to the next accumulating means 12 upon receipt of the first pulse of the third digit of the code shown in FIGURE 2. Upon completion of the count of the last pulse of the last digit the relays $R_9$ will close when the relays $R_2$ and $R_3$ open. This will close the contacts $K_{90}$ and connect the stepping switches to the external interrogating device. For the code shown the stepping switch $S_1$ will be positioned at two units, stepping switch $S_2$ at three units and stepping switch $S_3$ at one unit. As explained above, the interrogating circuit will couple each stepping switch simultaneously or in sequence to the device being controlled by the digital code.

From the above description it can be seen that this invention has provided a simple electro-mechanical means for converting a digital code to a useful output. More particularly, the invention converts the digital code to mechanical positions of the stepping switches which correspond to the individual digits of the code.

After the interrogating device has interrogated the three stepping switches the device can be returned to its initial condition ready to receive a new digital code by including a time spacing having a greater duration than the time delay of the second timing means 16. As explained above, ten units would be a suitable time delay for the timing means 16 and thus the delay would have to be longer than ten units. After the timing means 16 has timed out the contacts 21 and 22 will open. The opening of a contact 22 will decouple the motor of the timing means 16 from the alternating current power supply 20 while the opening of the contacts 21 will decouple the lead 24 from the ground 23 and couple the lead 25 to the ground 23. When the lead 24 is decoupled from the ground 23 on the relays $R_4$, $R_5$, $R_6$, $R_7$, $R_8$ and $R_9$ will open since they will no longer be locked closed through the lead 24 and the ground 23. When the lead 25 is connected to the ground 23 the contacts 73, 74 and 75 of the stepping switches $S_1$, $S_2$ and $S_3$, respectively, will again be connected to ground and thus the stepping switches will return to their initial position.

While but one particular embodiment of this invention has been described in detail for purposes of illustration, many changes and modifications may be made without departing from the broad spirit and scope of this invention. Accordingly, this invention should not be limited to the particular details described above for purposes of illustration but only to its broad scope and spirit.

We claim as our invention:

1. A translator for converting a sequential digital code having a uniform pulse duration and uniform time spacing between pulses, digits and groups, to a useful output comprising:

(a) a separate accumulating means for each digit of the digital code;

(b) a keying means actuated by each of said pulses, said keying means being coupled to each of said accumulating means in sequence;

(c) a timing means coupled to said keying means, said timing means having a time delay longer than the time spacing between pulses and shorter than the time spacing between digits, said timing means being disposed to transfer said keying means from the first of said accumulating means to the succeeding accumulating means in response to the time spacing between the pulses of individual digits;

(d) means coupled to said accumulating means and actuated by said first timing means in response to the time spacing after the last digit to actuate an external circuit of an external readout means;

(e) and second timing means coupled to said first timing means and actuated by the time spacing between the pulses of each individual group of digits for coupling said keying means to a bypass means for bypassing said accumulating means for each succeeding digital code, said second timing means in addition having a reset means, said reset means being actuated by a time spacing longer than the normal time spacing between the pulses of each individual group of digits to reset all of said accumulating means.

2. A translator for converting a digital code having uniform pulse duration and uniform time spacing between pulses, digits and groups, to a useful output comprising:

a separate accumulator for each digit of the code, each accumulator having first and second relays and a stepping relay;

a time delay circuit having a time delay longer than the duration of the time spacing between individual pulses and shorter than the time spacing between the pulses of each digit;

a keying circuit disposed to receive said digital code, said keying circuit actuating said time delay circuit each time said keying circuit receives a pulse;

sad first relay of the first accumulator being coupled to the time delay circuit to lock in a closed position upon actuation of said time delay circuit;

said second relay of the first accumulator being coupled to said time delay circuit to lock in a closed position upon deactuation of said time delay circuit, said second relay of the first accumulating means being coupled to the first relay of the next accumulating means to lock said first relay of the next accumulating means in a closed position upon the next actuation of the time delay circuit;

the closing of said second relay of the first accumulating means in addition decoupling the stepping relay of the first accumulaing means from said keying circuit and coupling the stepping relay of the next accumulating means to the keying means, the closing of the second relay of the last accumulating means coupling all of the accumulaors to an external circuit;

and a second time delay circuit coupled to said first time delay circuit, said second time delay circuit having a time delay longer than the time spacing between groups of digits, said second time delay circuit in addition being reset each time said first time delay circuit is actuated and said second time delay being coupled to said accumulators to return all of said accumulators to their initial condition upon the occurrence of a time interval longer than the time delay of said second time delay.

References Cited by the Examiner

UNITED STATES PATENTS

| | | | |
|---|---|---|---|
| 1,498,544 | 6/24 | Fowler | 340—174 |
| 1,729,854 | 10/29 | Nelson | 179—18.211 |
| 1,930,525 | 10/33 | Levy | 340—287 |
| 1,986,972 | 1/35 | Hershey | 340—147 |
| 2,131,164 | 9/38 | Chauveau | 340—164 |
| 2,226,692 | 12/40 | Brunner | 340—147 |
| 2,236,822 | 4/41 | Hershey. | |
| 2,411,091 | 12/46 | Henderson | 340—164 |
| 2,542,800 | 2/51 | Dehn et al. | 179—27.3 |
| 2,624,795 | 1/53 | Bodoh | 340—147 |
| 2,626,314 | 1/53 | Coley | 340—354 X |
| 2,647,250 | 7/53 | Herrick | 340—168 |
| 2,724,183 | 11/55 | Edison | 340—354 X |

FOREIGN PATENTS 645,264 10/50 Great Britain.

NEIL C. READ, *Primary Examiner.*

EVERETT R. REYNOLDS, STEPHEN W. CAPELLI, *Examiners.*